United States Patent [19]
Hasebe et al.

[11] 3,787,828
[45] Jan. 22, 1974

[54] SELF-BALANCING INSTRUMENT

[75] Inventors: Takefumi Hasebe; Toshiaki Ando, both of Tokyo, Japan

[73] Assignee: Yokogawa Electric Works, Ltd., Tokyo, Japan

[22] Filed: Apr. 10, 1972

[21] Appl. No.: 242,585

[30] Foreign Application Priority Data
- Oct. 28, 1971  Japan.............................. 46-85765
- Apr. 14, 1971  Japan.............................. 46-27905

[52] U.S. Cl................. 340/187, 73/432 A, 346/32, 346/33 TP, 346/145
[51] Int. Cl. ....................................... G01d 15/00
[58] Field of Search .. 340/187; 346/32, 33 TP, 145; 73/432 A

[56] References Cited
UNITED STATES PATENTS

| | | | |
|---|---|---|---|
| 2,927,838 | 3/1960 | Yeiser................................ | 346/145 |
| 3,633,200 | 1/1972 | Ellison.............................. | 340/187 |
| 2,915,356 | 12/1959 | Reilly................................ | 346/145 |
| 3,631,518 | 12/1971 | Battaglia........................... | 346/145 |
| 3,691,845 | 9/1972 | Ladine.............................. | 73/342 A |
| 3,192,534 | 6/1965 | Blakeslee et al.................... | 346/145 |
| 2,985,728 | 5/1961 | Macune........................... | 346/33 TP |

Primary Examiner—John W. Caldwell
Assistant Examiner—Robert J. Mooney
Attorney, Agent, or Firm—Roland T. Bryan et al.

[57] ABSTRACT

A recording and/or indicating instrument adapted to receive a measured quantity in the form of an electrical signal produced by a primary transducer such as a thermocouple, and to compare such signal with a known standard signal. The deviation between the compared values is amplified to drive a servomotor which alters the standard signal to make it equal to the measurement signal. The value of the standard signal at the balance point is indicated and/or recorded. The servomechanism balance unit, comprising an amplifier, a slide-wire rheostat, is wholly located on a single base plate.

7 Claims, 6 Drawing Figures

SELF-BALANCING INSTRUMENT

BACKGROUND OF THE INVENTION

1. Field of the Invention

The present invention relates to a self-balancing instrument. More particularly, this invention relates to improvements in the construction of the self-balancing function section in a self-balancing instrument, i.e. the portions of the apparatus which perform the functions of a servomechanism.

2. Description of the Prior Art

In a self-balancing instrument, the deviation signal between an input measured signal and a reference signal is detected and amplified to drive a servomotor so as to make the deviation signal zero, thereby to effect self-balancing. The instrument comprises as its principal units a terminal section composed of outside connection terminals for the power supply and for an input signal; a self-balancing function section comprising a servomechanism including a slide-wire rheostat for comparing the input signal and the reference signal, and an amplifier for intensifying the deviation signal; and an indicating-and-recording section comprising a pointer, a recording pen, and recording paper.

Typical prior art instruments of this type include a housing containing an inner frame adapted to be drawn out of the housing. Some of the elements of the self-balancing function section are mounted on this inner frame, while others are fastened directly to the housing. For example, elements of the self-balancing function section may be disposed such that the slide-wire rheostat and the rebalancing motor (servomotor) are fixed to the inner frame, while a power transformer and the amplifier are fixed to the rear wall of the housing. Thus the prior art construction has been disadvantageous in that inspection or adjustment is complicated, and the time spent in trouble-shooting can be unduly long. Moreover, the prior art has been unsuitable for mass production. For example, when a self-balancing instrument of the two-pen type is to be constructed, an inner frame of a complicated and special configuration is required on which two sets of basic elements may be distributedly mounted. In accordance with one aspect of the present invention, all of the constituent elements of the self-balancing function section, i.e. the "balancing unit", are arranged integrally together as a single unit, secured to a single base plate.

SUMMARY OF THE INVENTION

A principal object of the present invention is to provide an improved self-balancing instrument. A more specific object is to provide a self-balancing instrument especially suitable for mass production at low cost.

In a preferred embodiment of the invention, a balancing unit is provided comprising a series of constituent elements which together perform the self-balancing function of a servomechanism ranging from an input circuit to a slide-wire rheostat. The instrument is well suited for mass production because a number of balancing units can be prepared for use either in one-pen or multi-pen instruments, e.g. only one of the balancing units is used in a one-pen instrument, while two are combined to assemble a two-pen instrument, as may be required. In addition, since both the one-pen type and the two-pen type employ quite the same sort of balancing unit, components are common. The manufacturing cost is therefore low.

Another object of the present invention is to provide a self-balancing instrument convenient for maintenance and handling. In one aspect of the invention, this is achieved through use of a fitting coupling the balancing unit and a string reeling pulley in an indicating-and-recording section, and by use of a connector for outside connection terminals. If the balancing unit develops a fault, it may be easily and promptly replaced with another new balancing unit to repair the instrument. In addition, if a test-input is fed to the balancing unit, a corresponding output will be produced. The balancing unit may therefore be adjusted without assembling an instrument. Thus, maintenance and handling are facilitated, and repair time may be shortened.

Still another object of the present invention is to provide a relatively quiet instrument. A cord for power supply and an input cord in the balancing unit and a cord for outside transmission are separately constructed. The contact portions between the balancing unit and an inner frame are brought into adjacency through an insulating material. As a result, the instrument is effectively noise-free.

Other objects and advantages of the invention will be apparent from the following description.

DETAILED DESCRIPTION OF THE EMBODIMENT

Figure 1:
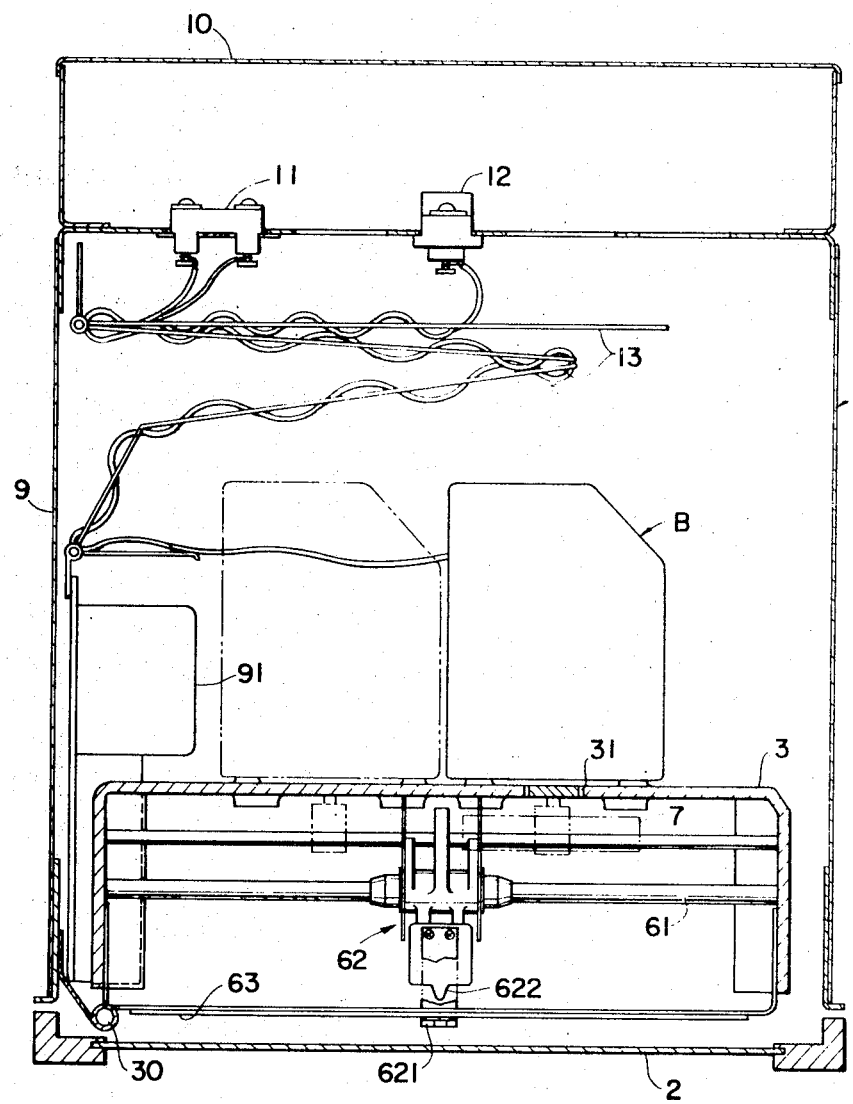
FIG. 1 is a horizontal section showing the construction of a self-balancing instrument according to the present invention.
Figure 2:
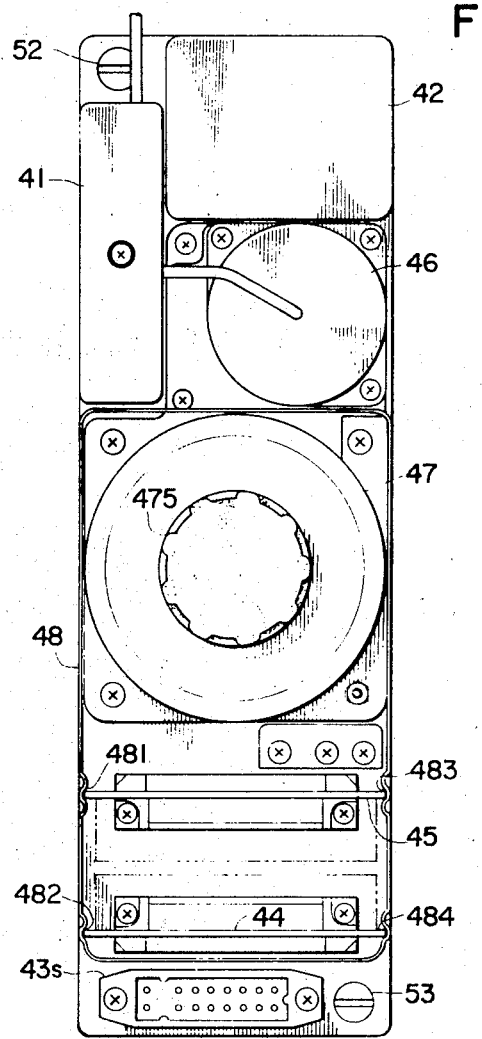
FIG. 2 is a rear elevation view of the balancing unit.

Referring now to FIG. 1, the instrument comprises a square-box-like housing 1 having a door 2 and an inner frame 3 to which is secured a balancing unit B. Referring also to FIGS. 2 to 5, the balancing unit comprises a series of servomechanism elements including a relaying terminal box 41, a power transformer 42, an input connector 43, first and second printed circuit boards 44 and 45, a rebalancing motor 46, and a slide-wire rheostat 47. All of the constituent elements of the balancing unit are integrally assembled in a single unit. The power transformer 42 is supplied on its primary side with a supply voltage of 100V or 112V, and furnishes desired voltages from its secondary to the rebalancing motor 46 and two printed circuit boards 44 and 45.

The relaying terminal box 41 comprises a lower stage 41a, an upper stage 41b, and a cover 41c. The interior of the lower stage 41a is divided into two chambers, one of which 411 is used as a terminal box for the primary of the power transformer 42, while the other 412 is used as a terminal box for the secondary. The chamber 411 is provided with a 100V terminal 413, a 112V terminal 414 and a common terminal 415. The common terminal 415 has a movable short-circuiting plate 416 attached thereto. The upper terminal box 41b is used for relaying of additional slide-wire rheostats as hereinafter described.

The first printed circuit board 44 includes electronic circuits such as a measuring range, a filter for removing noise in input signals, and a constant-voltage circuit for power supply to the slide-wire rheostat 47. The second printed circuit board 45 includes an amplifier circuit which converts a deviation signal between an input signal and a reference signal into an intensified alternating current signal. The first and second printed circuit boards 44 and 45 are of the plug-in type, so that they may be freely taken out of and pushed into sockets $44_s$ and $45_s$, respectively.

The slide-wire rheostat 47 has a frame 470, an annular resistance wire 471, and a brush 473 mounted on a slide shaft 472. At one end of this shaft is a square male joint 474 made of a synthetic resin, and at the other end a rotary knob 475. The unit further includes a relaying base of lead wires 479.

Figure 5:
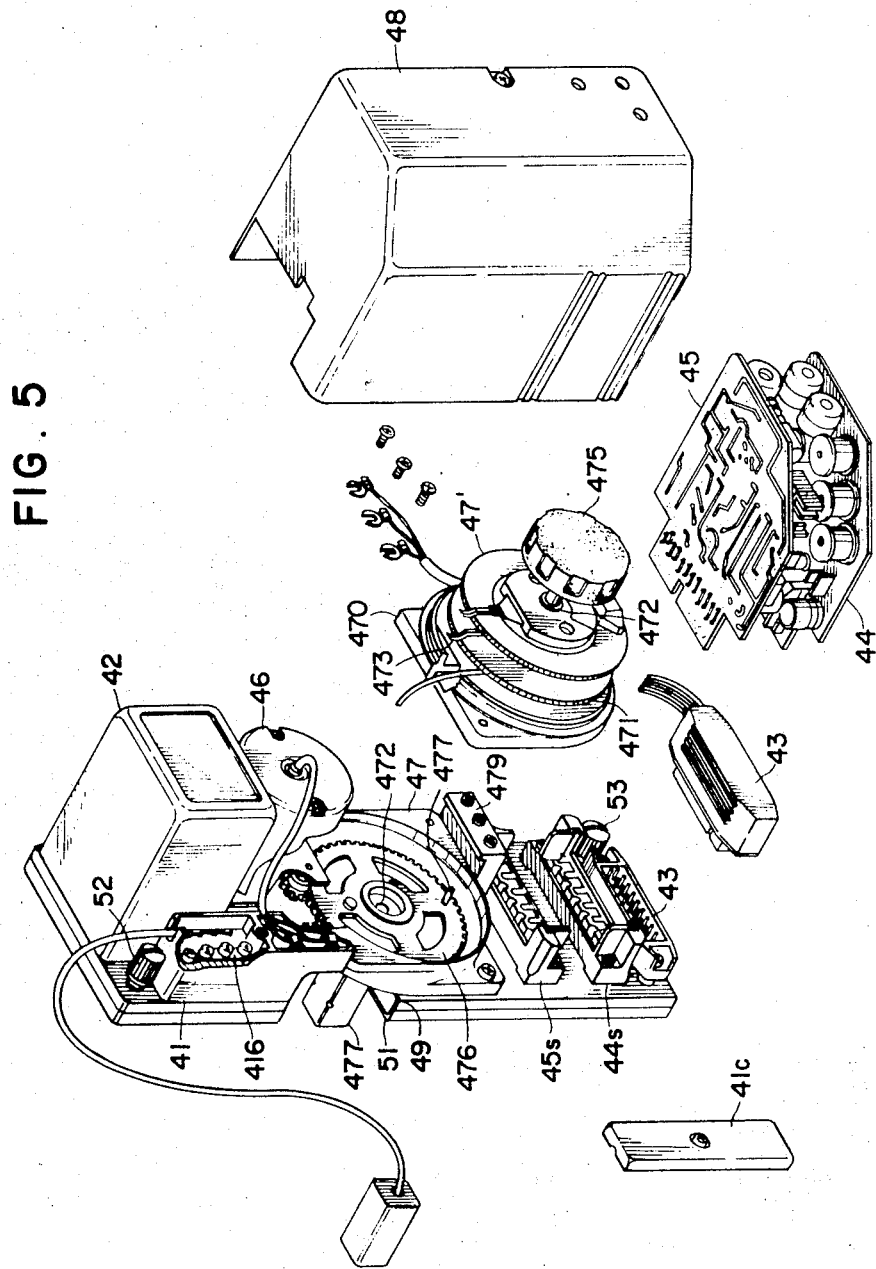
FIG. 5 is a perspective view with parts of the balancing unit disassembled.

Referring particularly to FIG. 5, both the frame 470 and the rotary shaft 472 are constructed to permit separation into their component parts. The rotary knob 475 and the brush 473 are fixed on the right-hand side of the shaft. The shaft parts 472a and 472b are coupled together through an engaging plate 478 with a pin 477 on a gear 476. The gear 476 is the final stage in a gear train which is arranged between the rebalancing motor 46 and the slide-wire rheostat 47. Since the slide-wire rheostat is separable into two parts by the frame 470 and the slide shaft 472, replacement or repair of the resistance wire 471, for example, is relatively convenient.

Additional slide-wire rheostats 47' and 47" are shown, and are of the same construction as that of the main slide-wire rheostat 47. They are all mounted on the rotary shaft 472, and transmit signals which correspond to a measured signal obtained at the main slide-wire rheostat. A shield case 48 surrounds the slide-wire rheostats 47, 47' and 47" and the printed circuit boards 44 and 45.

A metal base plate 49 is mounted together with a printed base plate 50, and a protective cover 51 of an insulating material. At corresponding positions on both sides of the shield case 48, grooves 481, 482 and 483, 484 are formed as illustrated. When the slide-wire rheostats 47 etc. are covered with the shield case 48, both side ends of the first printed board 44 and the second printed board 45 are engaged in the grooves 481, 483 and 482, 484 to secure them firmly in place. With such construction, contact problems on the printed circuit boards are minimized. Holes (not shown) are provided at suitable positions of the metal base plate 49. Connecting terminals of the respective constituent elements of the balancing unit B as described above, are exposed through the holes to the opposite side of the metal base plate 49. All the electrical connections among the respective constituent elements are made en bloc by the printed base plate 50. Two screws 52 and 53 secure the balancing unit B to the inner frame 3, through cylindrical insulation seats 521 and 531.

Figure 3:
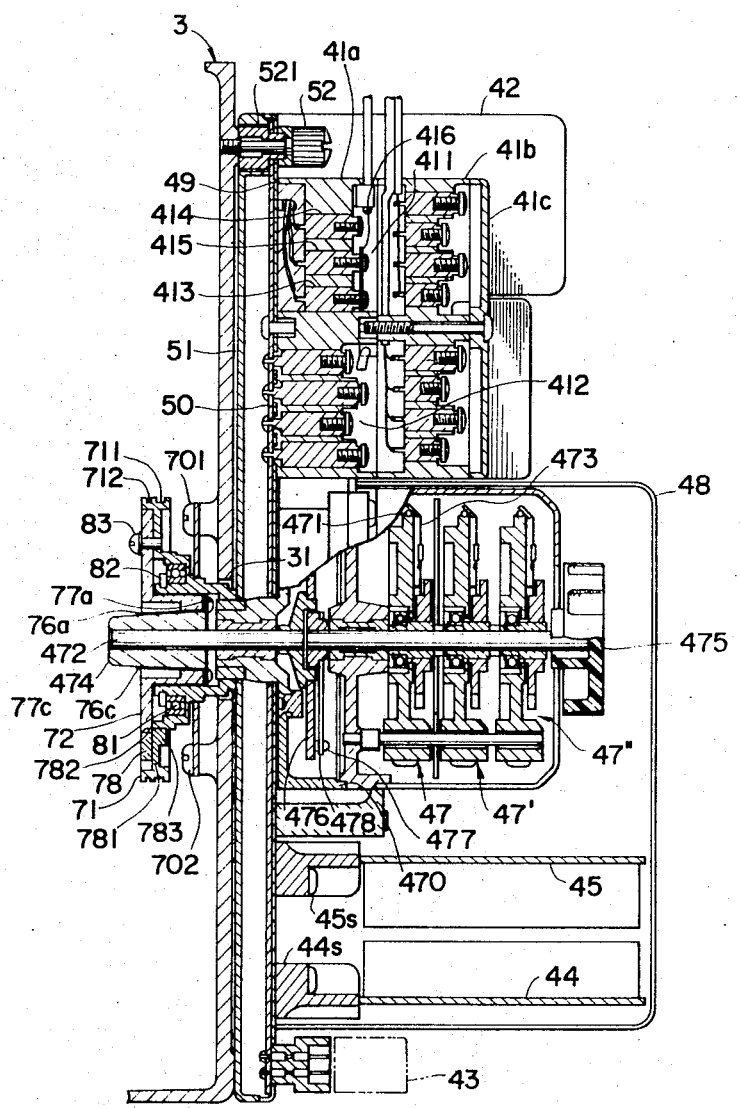
FIG. 3 is a vertical section of the left side of FIG. 2.
Figure 4:
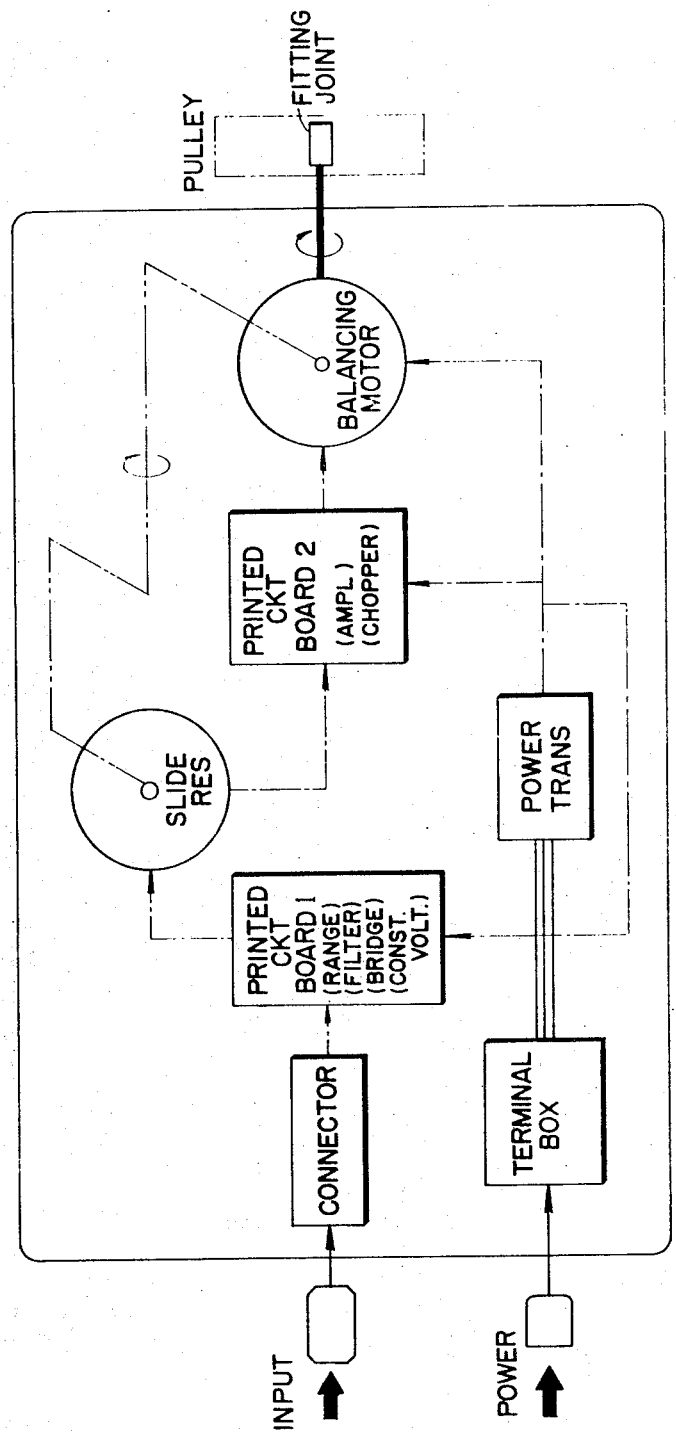
FIG. 4 is a block diagram showing the functional arrangement of the balancing unit.

Referring again to FIG. 1, an indicating-and-recording mechanism is provided at the front of the inner frame 3 and comprises a shaft 61 and a movable part 62 mounted on the shaft. The movable part carries a pointer 621 as well as a recording pen 622, referenced to a scale 63. Shown enclosed by two-dot chain lines is a pulley 7 for reeling a string and included in the indicating-and-recording mechanism. A member 8 (FIG. 6) is provided for mounting the pulley 7. Referring also to FIG. 3, the mounting arrangement includes a bearing 81 pressedly inserted in a cylindrical part 82 of the mounting member 8. The pulley 7 is rotatably mounted through the bearing 81 on the mounting member 8. The mounting member 8 is fixed to the front of the inner frame 3 by screws 83 and 84, opposite an opening 31 provided in the inner frame 3.

The pulley 7 comprises a rotary wheel 71 and a plate 72 which are integrally coupled by two screws 701 and 702. At the outer periphery of the rotary wheel 71, there are formed grooves 711 and 712. A metal strip (not shown) is placed in the wider groove 711, while a string (also not shown) comprising a metal wire with a synthetic resin coated thereon is placed in the narrower groove 712. The strip and the string constitute a reeled string, which is extended over between the string-reeling pulley 7 and the movable part 62 in the aforesaid indicating-and-recording section. The movable part 62 is moved in correspondence to the rotation of the string-reeling pulley 7, to indicate and record a measured value by means of the pointer 621 and the recording pen 622.

A square female joint 73 is formed at the axis of the coupled plate 72. The central parts of flat portions 74a to 74d in the female joint are scraped off in the axial direction, to form escape grooves 75a to 75d. Springs 76a to 76d, substantially hook-shaped in section, are provided with their shorter sides secured to the rear of the plate 72 (the right side in FIG. 3) by pins 77a to 77d (only two of which are shown), and with their longer sides loose and opposite the escape grooves 75a to 75d. The square female joint 73 is fitted with the male joint 474 of the balancing unit B.

Figure 6:
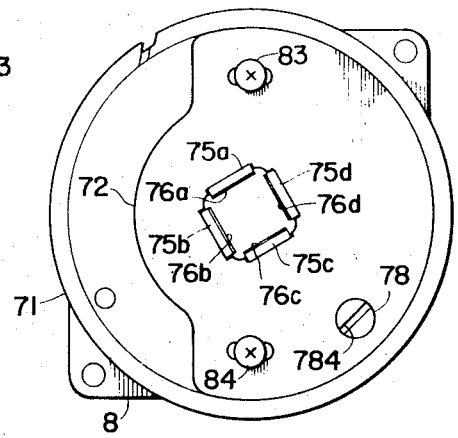
FIG. 6 is an elevation view of a string-reeling pulley in the indicating-and-recording section.

Interposed between the rotary wheel 71 and the coupled plate 72 is a rotary adjustment member 78 (FIGS. 3 and 6). The rotary member 78 is arranged to provide cylindrical sections including a larger-diameter part 781 on both sides of which are formed smaller-diameter parts 782 and 783. A slot 784 is provided in the outer smaller-diameter part 782, and the inner smaller-diameter part 783 is made eccentric to the other parts. The outer smaller-diameter part 782 is fitted with a small clearance into a hole on the side of the coupled plate 72, while the smaller-diameter part 783 (eccentric to the larger-diameter part 781) is engaged in circumferentially extended arcuate hole and a radially extended elongate hole respectively formed on the side of the rotary wheel 71. The rotary wheel 71 and the coupled plate 72 are rotationally slidably adjusted by loosening the screws 701 and 702 and turning the rotary member 78, so that the relative angle about their axes may be altered. Thus, adjustment may be made of the relative positions of the pointer connected on the side of the rotary wheel 71 and the brush 473 on the slide-wire rheostat 47.

Returning again to FIG. 1, a recording-paper feeding section 9 is provided with an electric motor 91, a connecting-terminal section 10 having terminals 11 and 12 for input signals and for power supply, and a wiring holder 13 for holding wires.

It will be apparent that in the apparatus of the foregoing construction, the balancing unit B is constructed in integral form. After the constituent elements of the balancing unit B, such as the power transformer 42, are mounted on the metal base plate 49, the printed board 50 is soldered. The balancing unit B thus assembled is secured to the rear of the inner frame 3 by screws 52 and 53, and electrical connections with the outside are made by the connector at the extreme end of the relaying terminal box 41 and the input connector 43. When the balancing unit B is secured to the inner frame 3, the male joint 474 of the slide-wire rheostat 47 is inserted into the female joint of the string reeling pulley 7, so that the balancing unit B and the indicating-and-recording section are automatically joined. Since the connecting means between the balancing unit B and the indicating-and-recording section is of the plug-in type, both sections are automatically coupled by merely securing the balancing unit B to the inner frame 3. Hence, the handling is quite convenient.

In addition, the balancing unit B is secured to the inner frame 3 through the male joint 474 of insulating material, the insulating seat 521 and 531 of screws 52 and 53, and the protective cover 51. Thus, the whole balancing unit B is electrically shielded from the inner frame 3, and the instrument is constructed in an essentially noise-proof manner.

When power is supplied to the relaying terminal box 41 and an input signal is fed through the input connector 43, desired voltages are derived on the secondary side of the power transformer 42. The voltages are supplied to the first and second printed circuit boards 44, 45 and the rebalancing motor 46 in the balancing unit. The supply voltage may be simply changed-over by moving the short-circuiting plate 416 in the relaying terminal box 41. The input signal from the input connector 43 is fed through the first printed circuit board 44 to the slide-wire rheostat 47, and is compared with a reference value. The deviation signal is converted into alternating current and is amplified on the second printed circuit board 45. The amplified signal is applied to a driving coil of the rebalancing motor 46 which rotates in either direction to make the deviation zero. It thereby rotates the shaft 472 of the slide-wire rheostat 47 through the gear 476, and stops the movable part 62 in the indicating-and-recording section at a balanced position by means of the string reeling pulley 7. The magnitude of the input signal may be measured from the pointer 621 and the recording pen 622 at this time.

In order to fabricate a self-balancing instrument of the two-pen type when there are two quantities to be measured, a further balancing unit may be secured on the inner frame 3 as shown by broken lines in FIG. 1. The rotary shaft 472 of the slide-wire rheostat 47 may be rotated at adjustment or inspection of the instrument by the knob 475. The balancing unit B may be used with an output section having no recording function, if desired.

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

We claim:
1. A self-balancing instrument comprising:
   a housing;
   an inner frame in said housing;
   means mounting said inner frame for rotary horizontal movement towards the outside of the housing;
   said inner frame being formed with a hole communicating between the front and the back of said frame;
   drive means on the front of said inner frame for driving a movable part of an indicating-and-recording section; and
   a balancing unit secured to the back of said inner frame and comprising a servomechanism the elements of which are mounted on a base plate;
   said balancing unit including a rheostat having a rotatable shaft extending through said hole to the front of said inner frame; and
   means coupling said shaft to said drive means.

2. An instrument according to claim 1, wherein said balancing unit includes a terminal box for the primary side of a power transformer; said terminal box including a short-circuiting plate for changing the circuit connections to suit different supply voltages.

3. An instrument according to claim 1, including a printed connection plate on the back of said base plate to effect electrical connections among said constituent elements of said balancing unit.

4. An instrument of the self-balancing type according to claim 1 wherein
   said balancing unit is secured to said inner frame by contact portions of insulating material, thereby to electrically insulate said balancing unit from said frame.

5. A self-balancing instrument according to claim 1, wherein said coupling means comprises:
   a male joint having an inserting part with axial flat parts and which is connected to said rheostat;
   a female joint comprising means formed with an opening having substantially the same shape as said inserting part to allow said inserting part to be fitted; and
   springs provided on said flat parts.

6. A self-balancing instrument according to claim 1, wherein said drive means comprises a string reeling pulley including a rotary wheel for laying a reeled string thereon and a coupled plate for connecting to said rheostat;
   a rotary member having an eccentric part disposed between said rotary wheel and said coupled plate; and
   means operable by rotation of said rotary member for effecting relative slidable rotation between said rotary wheel and said coupled plate, thereby altering the relative positions between a movable output element of said indicating-and-recording section and the movable control part of said rheostat.

7. A self-balancing instrument according to claim 1 having an indicating-and-recording section with a plurality of separate means for indicating and recording signals each having its own drive means, each separate indicating-and-recording means having a corresponding balancing unit secured to the back of said inner frame with a rotatable shaft extending through a hole in the inner frame to the front of the inner frame and means coupling the shaft to the corresponding drive means.

* * * * *